Aug. 4, 1925.
L. B. OESTERN
1,548,547
END THRUST COLLAR FOR CRANK SHAFT BEARINGS
Filed Dec. 2, 1922
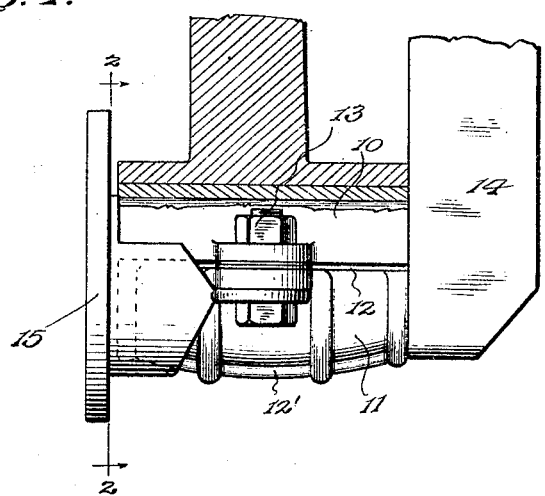
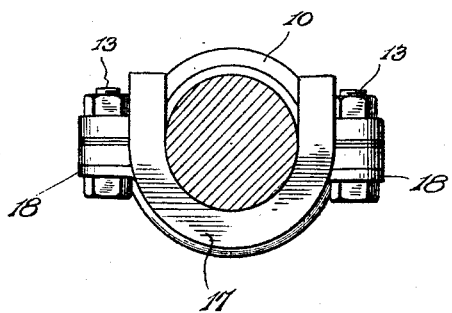
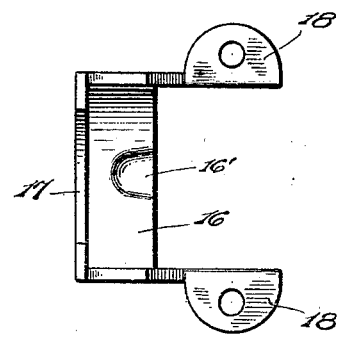
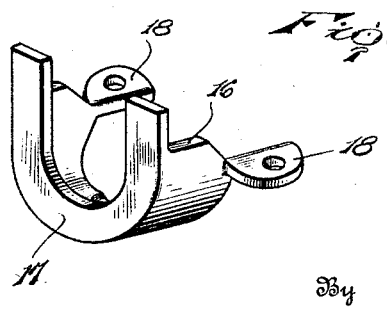
Inventor
L. B. Oestern.
By Lacy & Lacy, Attorneys Patented Aug. 4, 1925.

1,548,547

UNITED STATES PATENT OFFICE.

LESTER B. OESTERN, OF HARPERS FERRY, IOWA.

END-THRUST COLLAR FOR CRANK-SHAFT BEARINGS.

Application filed December 2, 1922. Serial No. 604,562.

*To all whom it may concern:*

Be it known that I, LESTER B. OESTERN, citizen of the United States, residing at Harpers Ferry, in the county of Allamakee and State of Iowa, have invented certain new and useful Improvements in End-Thrust Collars for Crank-Shaft Bearings, of which the following is a specification.

This invention relates to an improved end thrust collar for engine crank shaft bearings, being particularly designed for use in connection with the crank shaft bearings of Ford engines, and seeks, as one of its principal objects, to provide a device which may be easily and quickly applied to the rear main crank shaft bearing of such an engine for taking up end play of the crank shaft.

The invention seeks, as a further object, to provide a device which, in being applied, will not necessitate the removal of the usual shims of the bearing nor otherwise molesting the shims.

And the invention has as a still further object to provide a device which, while being capable of readily fitting the rear main bearing of a Ford engine crank shaft, will, nevertheless, be of such thickness and sturdiness throughout that premature wear or failure of the device will be effectually prevented.

Other and incidental objects will appear hereinafter.

In the drawings:

Figure 1 is a fragmentary elevation showing my improved end thrust collar applied to the rear main bearing of the crank shaft of a Ford engine, parts being broken away and illustrated in section, Figure 2 is a vertical sectional view on the line 2—2 of Figure 1, looking in the direction of the arrows, Figure 3 is a detail plan view of the device, and Figure 4 is a detail perspective view of the collar.

Referring now more particularly to the drawings, I have, in order to clearly bring out the mounting and function of my improved end thrust collar, shown the device in connection with the main rear crank shaft bearing of a Ford engine, the device being, as previously intimated, particularly designed for use in connection with the rear crank shaft bearings of engines of such make. The upper half of the bearing, which half is integral with the engine block, is indicated at 10 and associated therewith is the usual bearing cap 11 spaced with respect to the half 10 by one or more shims 12 and having a center rib 12′. Securing the bearing cap are the customary cap bolts 13 extending through the mating ears of the halves of the bearing. The engine crank shaft is indicated at 14 and, as is well known, this crank shaft is provided at its rear end with a circular flange 15 confronting the rear end of the bearing. Normally, the babbitt of the bearing projects at the ends thereof to sustain the end thrust upon the crank shaft. However, since the pressure exerted against the low speed clutch pedal of a Ford vehicle tends to pull the crank shaft of the vehicle engine rearwardly while the pressure of the high speed clutch spring tends to push the crank shaft forwardly, the babbitt at the ends of the rear crank shaft bearing soon wears away permitting end play of the crank shaft. This results, when the crank shaft is pulled rearwardly, in too great clearance between the magnets and field coils of the engine magneto so that the resultant improper functioning of the magneto renders the engine hard to start while, when the crank shaft is pushed forwardly, the magnets strike the coils. It is, therefore, imperative that the end play of the engine crank shaft be duly eliminated and the present invention, therefore, seeks to provide a device whereby this may be accomplished at minimum expense, time and labor.

In carrying the invention into effect, I employ a segmental body plate 16 provided at its rear edge with a medial socket 16′ and formed on the plate at its forward edge is a laterally directed U-shaped bearing flange 17 having its end portions extending in parallel relation beyond the ends of the body plate. Formed on the rear edge of the plate near its ends are oppositely directed lateral ears 18. Thus, as will be seen, the device preferably comprises an integral structure and may be formed of brass or other approved material.

The body plate 16 of the device is shaped to fit the bearing cap 11 so that by removing the bolts 13, the device may be applied over the adjacent end of the cap to dispose the bearing flange 17 between the rear end of the bearing and the flange 15 of the crank shaft when the ears 18 of the device will overlie the ears of the cap mating therewith, while the socket 16′ of the body plate 16 will snugly accommodate the rib 12'. Accordingly, the bolts 13 may be engaged through the ears 18 and through the mating ears of the bearing, as shown in Figure 2, for rigidly securing the device in position. As will be appreciated, the device may, if desired, be reversed to dispose the flange 17 at the forward end of the bearing and, in this connection, attention is directed to the fact that in applying the device, the shims 12 need not be removed nor molested. This feature is of importance since the device may be accordingly applied without the necessity for refitting the bearing cap. If sufficient clearance is not present at the end of the bearing where it is desired to insert the bearing flange 17, the babbitt at said end of the bearing may be filed off the necessary amount and it is to be noted that by employing a U-shaped bearing flange, the ends of said flange overlap the joints between the upper and lower halves of the bearing, overlying a portion of the rear end edge of the upper half of the bearing to provide a proportionately increased bearing surface to cooperate with the crank shaft. Thrust of the crank shaft will thus be sustained by both the upper and lower halves of the bearing. Furthermore, it is to be noted that the bearing flange is of a thickness equal to the thickness of the body plate 16 so that the bearing flange cannot be torn from the body plate under the frictional drag of the crank shaft while, at the same time, the efficiency of the bearing flange will be proportionately prolonged.

Having thus described the invention, what is claimed as new is:

1. The combination with a crank shaft, a split bearing journaling the shaft and having opposing side edges, and fastening devices securing the parts of the bearing together about the shaft, of a bearing member at one end of the bearing to receive end thrust of the crank shaft and provided with means extending externally of the bearing free from interposition between said edges to be engaged by said fastening devices securing said bearing member upon the bearing without disturbing the relation of the parts of the bearing to the crank shaft.

2. The combination with a crank shaft, a split bearing journaling the shaft and having opposed side edges, and fastening devices securing the parts of the bearing together about the shaft, of a collar secured by said fastening devices to extend at the outer side of the bearing free from interposition between said edges whereby the relation of said parts to the shaft is unaffected, the collar being provided with a bearing flange overhanging one end of the bearing to sustain end thrust of the crank shaft.

3. The combination with a crank shaft, a split bearing journaling the shaft and having opposed side edges, and bolts securing the parts of the bearing together, of a collar secured by said bolts and including a plate extending at the outer side of the bearing free from interposition between said edges whereby the relation of said parts to the crank shaft is unaffected, the plate being formed with ears receiving said bolts and with a flange overlying one end of the bearing to receive end thrust of the crank shaft.

4. An end thrust device including means to extend at the outer side of a split bearing free from interposition between the confronting faces of the bearing at the split therein connected with the bearing by an element securing the parts of the bearing together and provided with a bearing member to lie at one end of the bearing.

5. An end thrust collar for split crank shaft bearings including a body plate to extend at the outer side of the bearing free from interposition between the confronting faces of the bearing at the split therein and provided at one edge thereof with a bearing flange to lie at one end of the bearing and at its opposite edge with spaced ears for engagement by elements connecting the collar with the bearing and securing the parts of the bearing together.

6. An end thrust collar for split crank shaft bearings including a segmental plate to extend at the outer side of the bearing free from interposition between the confronting faces of the bearing at the split therein and provided at its rear edge with a socket to receive a rib upon the bearing locking the collar against turning movement and at its forward edge with an upstanding bearing flange to lie at one end of the bearing and having its ends extending in substantially parallel relation beyond the ends of the plate to project across the joint between the parts of the bearing, said plate being provided at its opposite edge with spaced outwardly directed lateral ears disposed near the ends of the plate for engagement by elements connecting the collar with the bearing and securing the parts of the bearing together.

In testimony whereof I affix my signature.

LESTER B. OESTERN. [L. S.]